(12) United States Patent
Banga et al.

(10) Patent No.: US 8,041,761 B1
(45) Date of Patent: Oct. 18, 2011

(54) VIRTUAL FILER AND IP SPACE BASED IT CONFIGURATION TRANSITIONING FRAMEWORK

(75) Inventors: Gaurav Banga, Sunnyvale, CA (US); Mark Muhlestein, Tuscon, AZ (US)

(73) Assignee: NetApp, Inc., Sunnyvale, CA (US)

( * ) Notice: Subject to any disclaimer, the term of this patent is extended or adjusted under 35 U.S.C. 154(b) by 1257 days.

(21) Appl. No.: 10/327,755

(22) Filed: Dec. 23, 2002

(51) Int. Cl.
*G06F 15/16* (2006.01)

(52) U.S. Cl. ........ 709/201; 709/220; 709/223; 709/204; 705/51; 705/52; 705/64; 726/2; 726/15; 726/27

(58) Field of Classification Search .................. 709/201, 709/220, 223, 204; 718/1; 719/330; 705/51, 705/52, 64; 726/2, 15, 27
See application file for complete search history.

(56) References Cited

U.S. PATENT DOCUMENTS

| 5,163,131 | A |   | 11/1992 | Row et al. |
| 5,355,453 | A |   | 10/1994 | Row et al. |
| 5,485,579 | A |   | 1/1996 | Hitz et al. |
| 5,802,366 | A |   | 9/1998 | Row et al. |
| 5,819,292 | A |   | 10/1998 | Hitz et al. |
| 5,931,918 | A |   | 8/1999 | Row et al. |
| 5,941,972 | A |   | 8/1999 | Hoese et al. |
| 5,948,110 | A |   | 9/1999 | Hitz et al. |
| 5,950,225 | A |   | 9/1999 | Kleiman |
| 5,963,962 | A |   | 10/1999 | Hitz et al. |
| 5,999,988 | A | * | 12/1999 | Pelegri-Llopart et al. .... 719/330 |
| 6,038,570 | A |   | 3/2000 | Hitz et al. |
| 6,058,423 | A | * | 5/2000 | Factor ........................... 709/226 |
| 6,065,037 | A |   | 5/2000 | Hitz et al. |
| 6,138,126 | A |   | 10/2000 | Hitz et al. |
| 6,289,356 | B1 |   | 9/2001 | Hitz et al. |
| 6,311,213 | B2 | * | 10/2001 | Dawson et al. ............... 709/217 |
| 6,425,035 | B2 |   | 7/2002 | Hoese et al. |
| 6,564,261 | B1 | * | 5/2003 | Gudjonsson et al. ......... 709/227 |
| 6,681,238 | B1 | * | 1/2004 | Brice et al. ........................ 718/1 |
| 6,701,437 | B1 | * | 3/2004 | Hoke et al. ..................... 726/15 |
| 6,728,764 | B1 | * | 4/2004 | Wilson et al. ................. 709/220 |
| 6,735,286 | B1 | * | 5/2004 | Hansen et al. .................. 379/52 |

(Continued)

OTHER PUBLICATIONS

U.S. Appl. No. 10/035,664, Mark Muhlestein et al.

(Continued)

*Primary Examiner* — Thuong T Nguyen
(74) *Attorney, Agent, or Firm* — Cesari and McKenna, LLP

(57) ABSTRACT

A system and method enables gradual transitioning of a server, such as a filer, to a new security domain and/or IP address scheme. A single physical platform may comprise multiple logical servers, such as virtual filers (vfilers), that simultaneously participate in different security domains and IP address schemes. Each logical server is allocated its own set of storage resources, such as volumes and qtrees, and network resources, such as network addresses. Additionally, a common set of storage resources may store a data set that is accessible to logical servers that participate in the different security domains and/or IP address schemes. Therefore, the server can transition from an old security domain to a new, e.g., upgraded, security domain, by gradually phasing out file access requests sent to a logical server in the old domain and redirecting those requests to a logical server in the new security domain. Similarly, the server can transition from an old IP address scheme to a new IP address scheme by gradually redirecting file access requests from one logical server to another. Since the invention enables multiple logical servers to access the server's data set, clients do not experience any downtime in service during the server's transition to a new security domain and/or IP address scheme.

20 Claims, 10 Drawing Sheets

U.S. PATENT DOCUMENTS

| | | | |
|---|---|---|---|
| 6,854,021 B1* | 2/2005 | Schmidt et al. | 710/5 |
| 6,880,002 B2* | 4/2005 | Hirschfeld et al. | 709/223 |
| 6,985,956 B2* | 1/2006 | Luke et al. | 709/229 |
| 7,089,293 B2* | 8/2006 | Grosner et al. | 709/217 |
| 7,155,518 B2* | 12/2006 | Forslow | 709/227 |
| 7,308,717 B2* | 12/2007 | Koved et al. | 726/27 |
| 7,574,738 B2* | 8/2009 | Daude et al. | 726/15 |
| 7,581,219 B2* | 8/2009 | Neiger et al. | 718/1 |
| 7,603,320 B1* | 10/2009 | Shu | 705/64 |
| 2001/0044725 A1* | 11/2001 | Matsuda et al. | 704/269 |
| 2002/0069369 A1* | 6/2002 | Tremain | 713/201 |
| 2002/0184516 A1* | 12/2002 | Hale et al. | 713/200 |
| 2003/0051021 A1* | 3/2003 | Hirschfeld et al. | 709/223 |
| 2003/0105810 A1* | 6/2003 | McCrory et al. | 709/203 |
| 2003/0115267 A1* | 6/2003 | Hinton et al. | 709/204 |
| 2003/0229802 A1* | 12/2003 | Challener et al. | 713/200 |
| 2004/0044744 A1* | 3/2004 | Grosner et al. | 709/217 |
| 2004/0078419 A1* | 4/2004 | Ferrari et al. | 709/201 |
| 2004/0078467 A1* | 4/2004 | Grosner et al. | 709/226 |
| 2004/0111523 A1* | 6/2004 | Hall et al. | 709/230 |
| 2004/0117438 A1* | 6/2004 | Considine et al. | 709/203 |
| 2006/0015869 A1* | 1/2006 | Neiger et al. | 718/1 |
| 2006/0070114 A1* | 3/2006 | Wood et al. | 726/2 |

OTHER PUBLICATIONS

U.S. Appl. No. 10/035,666, Gaurav Banga et al.

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

* cited by examiner

VIRTUAL FILER AND IP SPACE BASED IT CONFIGURATION TRANSITIONING FRAMEWORK

FIELD OF THE INVENTION

The present invention relates to storage systems, such as filers, and, more specifically, to transitioning data associated with a file server to a new security domain and IP address scheme.

BACKGROUND OF THE INVENTION

A file server is a computer that provides file service relating to the organization of information on writeable persistent storage devices, such as memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL™) file system available from Network Appliance, Inc., Sunnyvale, Calif. The WAFL file system is implemented as a microkernel within an overall protocol stack of the filer and associated disk storage.

The disk storage is typically implemented as one or more storage "volumes" that comprise a cluster of physical storage devices (disks), defining an overall logical arrangement of disk space. Each volume is generally associated with its own file system. In the WAFL file system, a special directory, called a "qtree", may be created that has the properties of a logical sub-volume within the namespace of a physical volume. As used herein, a volume is a unit of storage comprising a file system or hierarchy of directories and files, and a qtree is a special directory similar to a mini-volume (mini-file system) or subdivision of a volume. Each file system object (file or directory) is associated with one and only one qtree, and quotas, security properties and other items can be assigned on a per-qtree basis. Each volume has its own file system identifier (ID) and each qtree within a volume has its own qtree ID.

A storage system may be configured to operate according to a client/server model of information delivery to thereby allow many clients to access an application service executed by a server, such as a file server. In this model, the client may comprise an application executing on a computer that "connects" to the file server over a computer network, such as a point-to-point link, shared local area network (LAN), wide area network (WAN) or virtual private network (VPN) implemented over a public network, such as the Internet. Network addresses, represented as alphanumeric computer names (such as URLs) or numeric addresses (such as Internet Protocol (IP) addresses), are often used as source and destination identifiers for communications among the clients and servers in a network. Each client may request the services of a file system on a file server by issuing file-system protocol messages (in the form of packets) to the network address of the server. It should be noted, however, that the file server may alternatively be configured to operate as an assembly of storage devices that is directly-attached to a (e.g., client or "host") computer. Here, a user may request the services of the file system to access (i.e., read and/or write) data from/to the storage devices. The set of data accessible from a server comprises its data set.

Typically, a storage system, such as a filer, participates in a security domain that performs, inter alia, naming and authentication functions. Members of the security domain share security information, which may include authorized user and group identifiers ("security objects"). A user with an account in a particular security domain can log onto and access his or her account from any server in the domain. Generally, one server can be in one security domain (for each file-system protocol) at a time. For example, a filer in a Windows-based environment may be in an NT4 domain for Common Internet File System (CIFS) access, whereas another filer in a Unix-based environment may be in a Network Information System (NIS) domain for Network File System (NFS) access. However, in some network architectures, it may be advantageous for a server to simultaneously participate in multiple, protocol-specific security domains. For instance, it may be desirable to configure a server to participate in a MS domain for Unix clients and protocols and in an NT4 domain for Windows clients and protocols.

Multi-protocol servers may be implemented using server consolidation techniques. Server consolidation is thus defined as the ability to provide many logical or virtual servers within a single physical server platform. Prior server consolidation solutions are configured to run multiple instances of a process, such as an application service. Other server consolidation solutions provide many independent servers that are essentially "racked together" within a single platform. Examples of virtual servers embodied within a single platform are web servers, database servers, mail servers and name servers.

Thus, a multi-protocol server may be embodied as a plurality of protocol-specific logical servers, each participating in a different security domain. However, conventional multi-protocol servers do not support multiple logical servers that implement the same file-system protocol in different security domains. For example, a multi-protocol server may implement a logical server in an NT4 domain for CIFS requests and implement a different logical server in a NIS domain for NFS requests. Yet, problems typically arise if the multi-protocol server simultaneously implements two logical servers for, e.g., CIFS requests in different security domains, such as NT4 and NT5.

These problems may manifest themselves in various ways, depending on the configuration of the multi-protocol server. For example, assume two logical servers on a conventional filer attempt to process NFS requests in different security domains (e.g., NIS and NIS+). Firstly, the filer may not be able to determine to which logical server a received NFS request should be transferred. In other words, the received request may not identify in which security domain the request was sent. Secondly, if the security domains implement similar naming and authentication schema, conflicts may occur if each of the domains assigns the same security object (e.g., user or group identifier) to different files in the filer's data set. Thirdly, another problem may arise when "non-coordinating"

administrators in the different domains set or change the on-disk security of files in the data set in a manner consistent with one security domain and not the other.

Because servers are generally not configured to simultaneously implement different security domains for a common file-system protocol, a protocol-specific server cannot participate in an old security domain and a new, updated security domain at the same time. However, information technology (IT) organizations frequently need to move their computer systems from one security domain to another, either due to changes in the IT infrastructure or due to richer functionality available in a newer type or version of naming and authentication software. Therefore, in order to transition a protocol-specific logical server (i.e. that processes CIFS requests) from one security domain to another, IT personnel typically set up and test the new domain "off-line," e.g. without any "live" users or traffic. Upon debugging the new domain software and implementation off-line, the IT personnel switch all production systems from the old domain to the new domain in a "single-stroke," i.e., during a designated day or weekend.

The above-mentioned single-stroke procedure for transitioning a server system from an old security domain to a new domain may involve multiple cycles of upgrade and revert steps in order to detect and fix problems with the new domain. That is, some problems can only be detected after the new domain becomes available to users and traffic (i.e., "on-line"), so the IT personnel may repeatedly have to revert to the old security domain to fix newly observed problems. Thus, the downtime of these steps may be unacceptable. The revert steps also may be difficult to perform. Furthermore, the single-stroke method may be expensive with regards to hardware resources since many computer systems may need to be substantially duplicated during the off-line testing of the new environment.

When a file server is transitioned from one security domain to another, e.g., in a single-stroke, the IP address scheme in which the server participates may change as well. However, sometimes it is desirable to transition the server to a new IP address scheme without changing its security domain. As used herein, an address scheme is defined as a set of rules that govern the interpretation and routing of network addresses. For example, networks configured for different IP address schemes may implement (i) different routing tables for a common range of IP addresses, (ii) a common routing table for different ranges of IP addresses, or (iii) different routing tables each having its own associated (possibly overlapping) range of IP addresses. Hereinafter, a range of IP addresses used in a network will be referred to as an IP address space.

A file server may be transitioned, e.g., by a system administrator, from one IP address scheme to another when organizational structure changes or the addition of new sub-networks necessitate reassignment of network addresses to clients and servers. Previously, the single-stroke method is used to configure network addresses, e.g. IP addresses, and other routing information off-line for those systems that change to a new IP address scheme. As when transitioning between security domains, the single-stroke method for changing IP address schemes may consume an unacceptable amount of time and resources.

SUMMARY OF THE INVENTION

The present invention overcomes the disadvantages of the prior art by providing a technique for gradually transitioning a server, such as a filer, to a new security domain and/or IP address scheme. Accordingly, during a "transition period" clients may access the server's data set in either the old or new security domain and/or IP address scheme. In contrast to prior approaches, the physical platform of the filer may comprise multiple logical servers that are configured to simultaneously participate in different security domains and/or IP address schemes. By enabling such participation among the logical or virtual servers, the novel technique allows IT managers to test an implementation of a new security domain and/or IP address scheme "on-line" without discontinuing use of the current implementation. Moreover, the technique allows a virtual server to be gradually transitioned from one security domain and/or IP address scheme to another, thereby consuming less time and resources than previously required.

In the illustrative embodiment, the filer instantiates multiple instances of virtual servers, also known as virtual filers (vfilers). A vfiler is a logical partitioning of network and storage resources of the filer to establish an instance of a protocol-specific logical server. Each vfiler is maintained and executed without affecting other vfilers on the platform. Dedicated filer resources, such as units of storage and network addresses of network interfaces, may be grouped and partitioned to establish different security domains among the vfilers. Yet common filer resources, such as a storage operating system and a file system, may be shared among the vfilers.

According to the invention, a filer may comprise two or more vfilers configured to participate in different security domains. In this case, the vfilers share a common set of storage resources, such as volumes or qtrees, that are accessible in each domain. Because the shared storage resources may be associated with different security objects in each security domain, the vfilers may be configured to "map" client security credentials (i.e., the clients' user and group identifiers) from one domain to the other. Thus, the filer may be transitioned, e.g., by a system administrator, from an old security domain to a new, e.g., upgraded, security domain, by gradually phasing out file access requests sent to a vfiler in the old domain and redirecting those requests to a vfiler in the new security domain. Since both vfilers share storage resources, clients do not experience any down-time in service from the filer during the transition.

In an alternate embodiment of the invention, a filer may comprise two or more vfilers, each participating in a different IP address scheme, yet configured to share a set of storage resources, such as volume or qtrees. Therefore, the filer may be transitioned, e.g., by an IT manager, from an old IP address scheme to a new IP address scheme by gradually phasing out file access requests sent to a vfiler participating in the old IP address scheme and redirecting those requests to a vfiler configured for the new IP address scheme. Since both vfilers share the filer's storage resources, the clients do not experience any downtime in service during the transition.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

A. Storage System Environment

Figure 1:
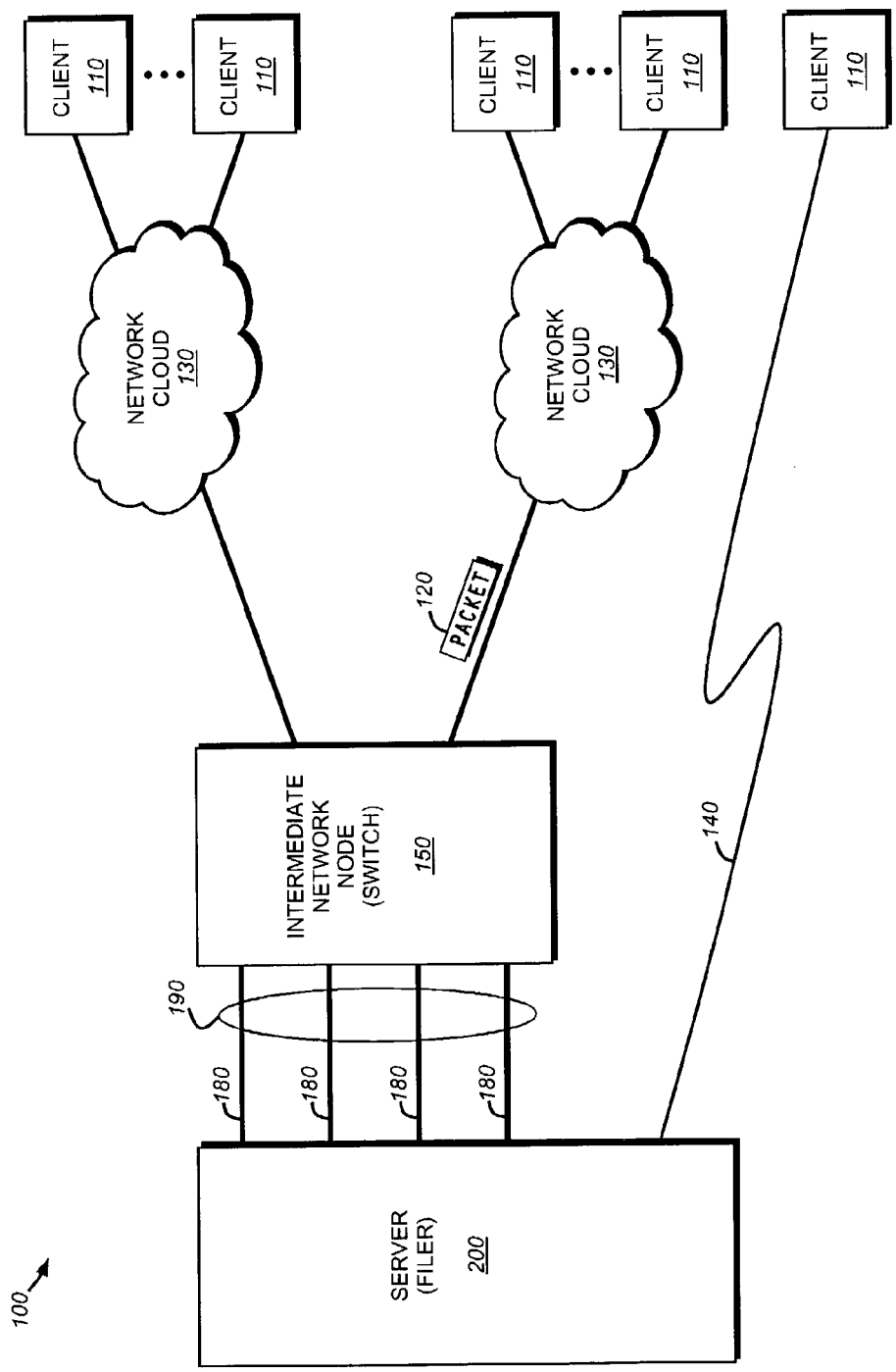
FIG. 1 is a schematic block diagram of a computer network including a plurality of clients and a server that may be advantageously used with the present invention.

FIG. 1 is a schematic block diagram of a computer network 100 including a plurality of clients 110 and a file server, such as a network storage appliance, that may be advantageously used with the present invention. The file server or filer 200 is a computer that provides file service relating to the organization of information on storage devices, such as disks. The clients 110 may be general-purpose computers configured to execute applications including file-system protocols, such as the conventional Common Internet File System (CIFS) protocol. Moreover, the clients 110 may interact with the filer 200 in accordance with a client/server model of information delivery. That is, each client may request the services of the filer, and the filer may return the results of the services requested by the client, by exchanging packets 120 encapsulating, e.g., the CIFS protocol format over the network 100. It will be understood to those skilled in the art that the inventive technique described herein may apply to any server capable of providing a service to any client in accordance with various applications executing on the client.

The filer 200 may be coupled to an intermediate network node, such as a router or switch 150, over a plurality of physical links 180, each of which may comprise, e.g., a gigabit Ethernet link, a 100 base T Ethernet link, a 10 base T Ethernet link or any similar link. The switch 150 is further coupled to the clients 110 over network clouds 130 configured as, e.g., local area networks (LANs) or virtual LANs (VLANs). Alternatively, the filer may be connected directly to one or more clients over a communications link 140 comprising a point-to-point connection or a shared medium, such as a LAN.

Figure 2:
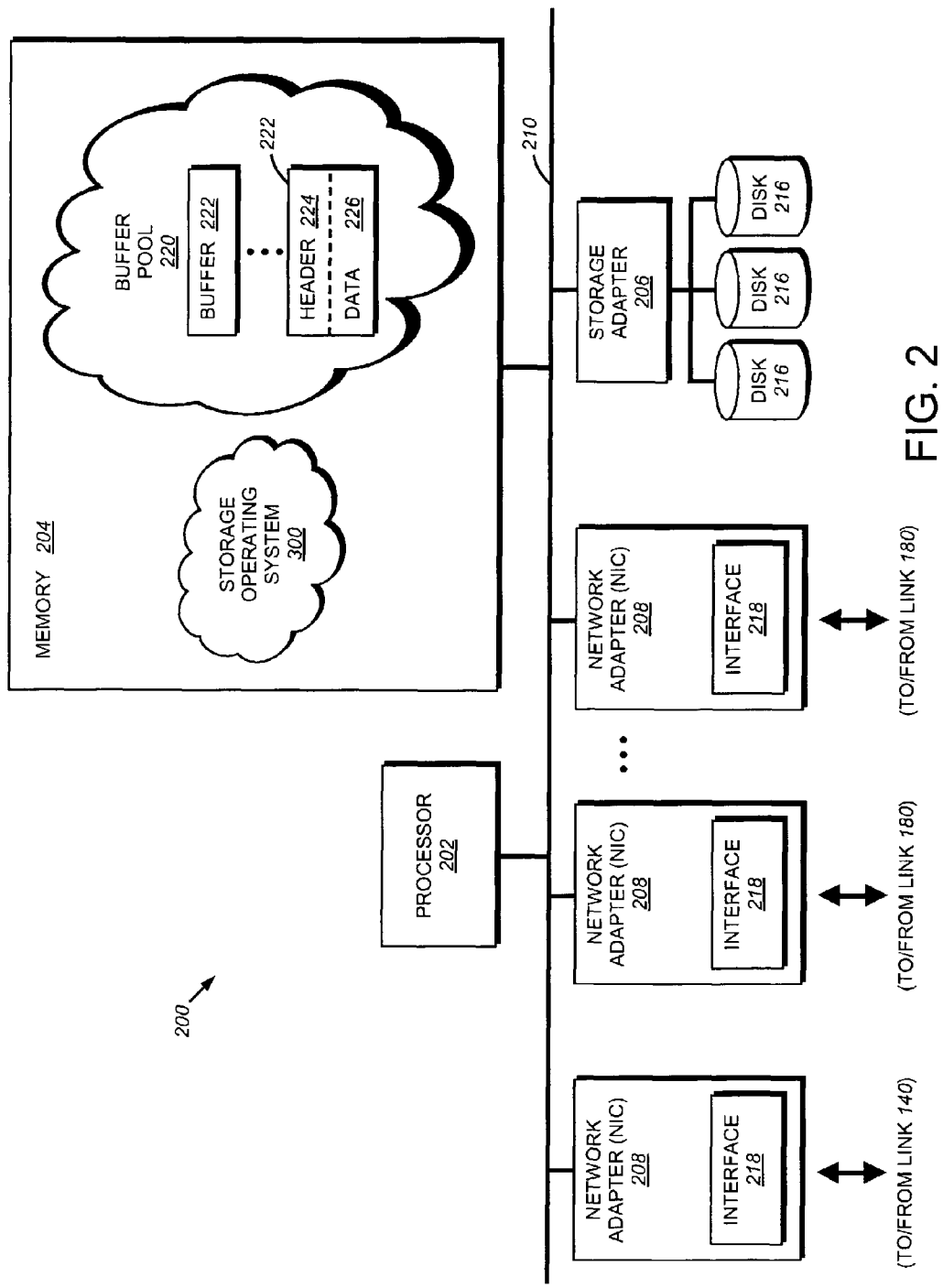
FIG. 2 is a schematic block diagram of a server, such as a network storage appliance or filer that may be advantageously used with the present invention.

FIG. 2 is a schematic block diagram of the filer 200 comprising a processor 202, a memory 204, a storage adapter 206 and one or more network adapters 208 interconnected by a system bus 210, which is preferably a conventional peripheral computer interconnect (PCI) bus 210. The filer also includes a storage operating system 300 that implements a file system to logically organize the information as a hierarchical structure of directories and files on disks 216 coupled to the storage adapter 206. In the illustrative embodiment described herein, the operating system 300 is preferably the NetApp® Data ONTAP™ operating system available from Network Appliance, Inc. that implements a Write Anywhere File Layout (WAFL) file system.

The memory 204 may be apportioned into various sections, one of which is a buffer pool 220 organized as a plurality of data buffers 222 for use by network drivers of the operating system 300. Each network driver is assigned a list of buffers 222 that are used to load incoming data requests received at interfaces 218 of the network adapter 208, as described herein. Other sections of the memory may be organized as storage locations that are addressable by the processor and adapters for storing software program code and data structures, including routing tables, associated with the present invention. The processor and adapters may, in turn, comprise processing elements and/or logic circuitry configured to execute the software code and access the data structures. The storage operating system 300, portions of which are typically resident in memory and executed by the processing elements, functionally organizes the filer by, inter alia, invoking storage and network operations in support of the services implemented by the filer 200. It will be apparent to those skilled in the art that other processing and memory means, including various computer readable media, may be used for storing and executing program instructions pertaining to the inventive technique described herein.

The network adapter 208 may comprise a network interface card (NIC) having the mechanical, electrical and signaling interface circuitry needed to connect the filer 200 directly to the communications link 140 or to the switch 150 over the physical links 180. In one embodiment, the physical links and interfaces may be organized as an aggregate or virtual interface (VIF) 190. Each NIC may include a single interface 218 such that, for a 4-link VIF, the filer includes 4 NICs 208. Alternatively, each NIC 208 may include 4 "quad port" interfaces 218, each of which is connected to a link 180 of the VIF 190. In another embodiment, the physical links and interfaces may be arranged as a de-aggregate or VLAN. Each interface 218 may be assigned one or more Internet Protocol (IP) addresses along with one media access control (MAC) address. However, when the physical interfaces 218 and their associated links 180 are aggregated as a single virtual interface 190, all of the physical interfaces respond to only one MAC address. That is, the physical interfaces 218 are organized into one virtual "pipe" having one logical interface that is assigned a common MAC address.

The storage adapter 206 cooperates with the storage operating system 300 executing on the filer to access information requested by the client, which information may be stored on any writeable media, such as the disks 216. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 202 (or the adapter 206 itself) prior to being forwarded over the system bus 210 to the network adapter 208, where the information is formatted into a packet 120 and returned to the client 110.

Storage of information on the filer is preferably implemented as one or more storage "volumes" that comprise a cluster of physical storage disks 216, defining an overall logical arrangement of disk space. Each volume is generally associated with its own file system. To facilitate access to the disks 216, the storage operating system 300 implements a file system that logically organizes the information as a hierarchical structure of directories and files on the disks. Each "on-disk" file may be implemented as set of disk blocks configured to store information, such as data, whereas the directory may be implemented as a specially formatted file in which information about other files and directories are stored. As noted, the storage operating system is preferably the Data ONTAP operating system that implements a WAFL file system. However, it is expressly contemplated that any appropriate file system can be used, and as such, where the term "WAFL" is employed, it should be taken broadly to refer to any file system that is otherwise adaptable to the teachings of this invention.

B. Storage Operating System

Figure 3:
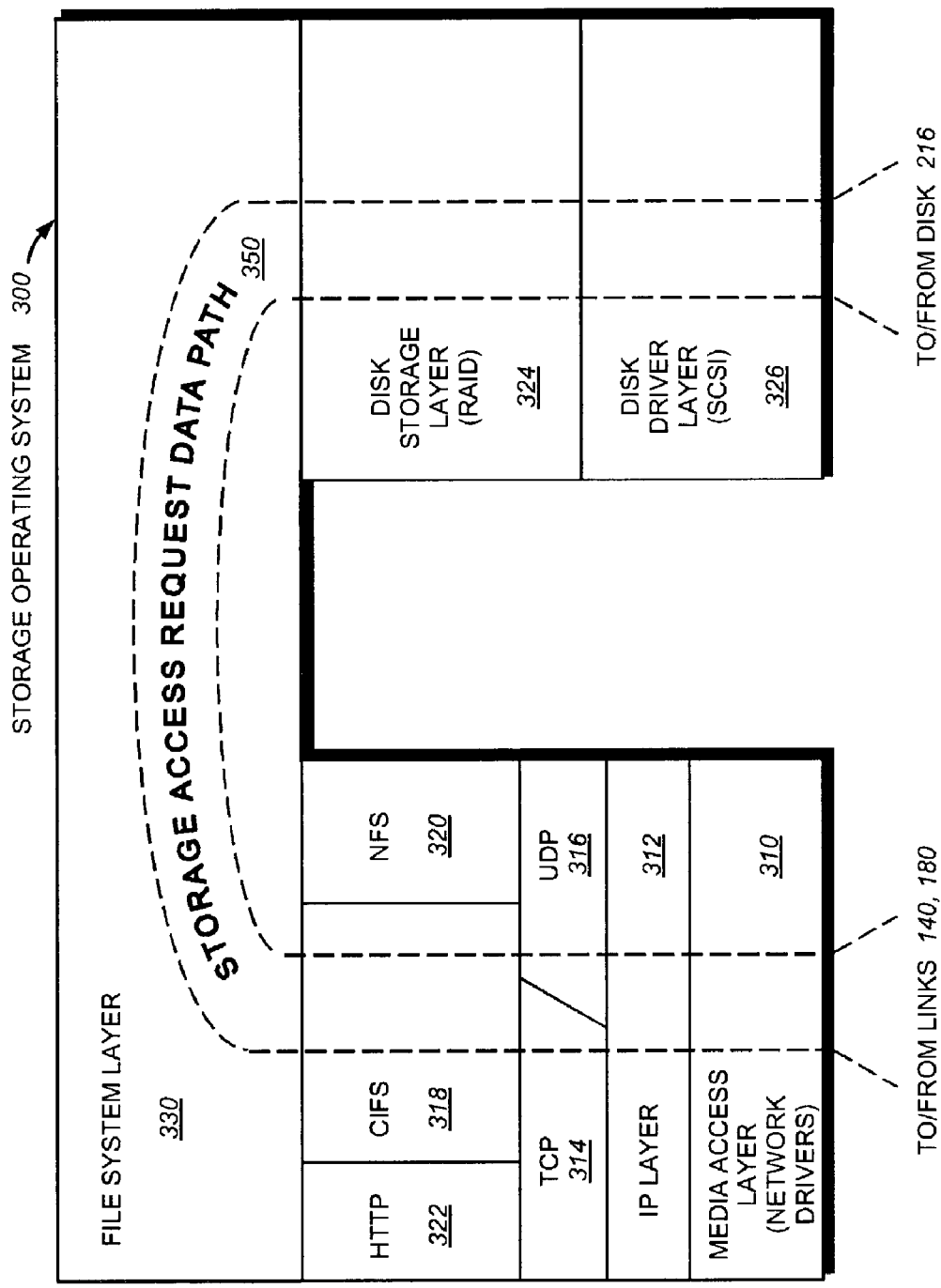
FIG. 3 is a schematic block diagram of a storage operating system that may be advantageously used with the present invention.

FIG. 3 is a schematic block diagram of an operating system 300 that may be advantageously used with the present invention. The storage operating system comprises a series of software layers, including a media access layer 310 of network drivers (e.g., a gigabit Ethernet driver). The operating system further includes network protocol layers, such as the IP layer 312 and its supporting transport mechanisms, the Transport Control Protocol (TCP) layer 314 and the User Datagram Protocol (UDP) layer 316. A file-system protocol layer provides multi-protocol data access and, to that end, includes support for the CIFS protocol 318, the Network File System (NFS) protocol 320 and the Hypertext Transfer Protocol (HTTP) protocol 322. The storage operating system 300 also includes a disk storage layer 324 that implements a disk storage protocol, such as a Redundant Array of Independent Disks (RAID) protocol, and a disk driver layer 326 that implements a disk access protocol such as, e.g., a Small Computer Systems Interface (SCSI) protocol.

Bridging the disk software layers with the network and file-system protocol layers is a file system layer 330 that preferably implements the WAFL file system. The on-disk format representation of the WAFL file system is block-based using, e.g., 4 kilobyte (kB) blocks and using inodes to describe the files. An inode is a data structure, e.g., a 128-byte structure, which is used to store information, such as meta-data, about a file. The meta-data contained in an inode may include, e.g., security objects indicating ownership and access permissions for the file (i.e., in the form of user identifiers UID and group identifiers GID), size of the file, file type and location of the file on disk. The WAFL file system uses a file handle, i.e., an identifier that includes an inode number, to retrieve an inode from disk. The file system layer 330 may also use files to store meta-data describing the layout of its file system. These meta-data files include, among others, an inode file.

Operationally, a request from a client 110 is forwarded as, e.g., a conventional CIFS protocol packet 120 over the computer network 100 and onto a network adapter 208 of the filer 200. A network driver of the media access layer 310 cooperates with the network adapter to load the request packet into a data buffer 222 and marks the buffer with the name of the physical interface 218 over which the incoming request was received at the filer. Each buffer 222 includes a header 224 and a data portion 226, with the incoming packet being loaded into the data portion. The contents of the header are maintained by the filer and include (i) the type of buffer, (ii) various flags and (iii) the incoming interface 218 marked by the filer. After being loaded with the incoming packet, the buffer 222 is essentially "pushed up" the network protocol stack and delivered to an appropriate application which services the requests by, e.g., fetching data stored on disks of the filer.

Specifically, the network driver 310 passes the buffer to the network protocol layers 312-314 and onto the CIFS layer 318 for additional processing prior to forwarding to the file system layer 330. The file system generates operations to load (retrieve) the requested data from disk 216 if it is not resident "in core", i.e., in the memory 204. If the information is not in memory, the file system layer 330 indexes into the inode file using the inode number to access an appropriate entry and retrieve a logical volume block number (VBN). The file system layer then passes the logical VBN to the disk storage (RAID) layer 324, which maps that logical number to one or more disk block numbers (DBN) and sends the latter to an appropriate driver (e.g., SCSI) of the disk driver layer 326. The disk driver accesses the data blocks corresponding to the DBNs from disk 216 and loads the requested data block(s) in memory 204 for processing by the filer. Upon servicing the request, the CIFS layer 318 allocates another (response) buffer 222 from the buffer pool 220 for the fetched data and further associates that response to the initial request. That is, the CIFS layer 318 marks the response buffer with the physical interface associated with the incoming request.

As noted, the filer 200 is configured to provide file service to a plurality of clients 110 and, as a result, generally returns data responsive to requests issued by the clients. In order to enhance its responsiveness, the filer implements a "fast path" technique that essentially returns a response over the same physical interface 218 that was used to receive a request from the client. To invoke the fast path technique, the CIFS layer 318 asserts a fast path flag within the buffer header 224 and then passes the buffer "down" the protocol stack to the IP layer 312, which examines the state of that flag. Assertion of the fast path flag informs the IP layer that it does not have to perform route calculation for this particular response. Accordingly, the interface within the filer targeted to receive the response buffer is the incoming interface 218 over which the request was received. The buffer is forwarded to that interface and the requested data is then returned to the client 110 over the network 100.

It should be noted that the software "path" through the storage operating system layers described above needed to perform data storage access for the client request received at the filer may alternatively be implemented in hardware. That is, in an alternate embodiment of the invention, the storage access request data path 350 may be implemented as logic circuitry embodied within a field programmable gate array (FPGA) or an application specific integrated circuit (ASIC). This type of hardware implementation may increase the performance of the file service provided by filer 200 in response to a file system request packet 120 issued by client 110. Moreover, in another alternate embodiment of the invention, the processing elements of adapters 206, 208 may be configured to offload some or all of the packet processing and storage access operations, respectively, from processor 202, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the file system layer to implement the WAFL file system semantics and manage data access. The storage operating system can also be implemented as an application program operating over a general-purpose operating system, such as UNIX® or Windows NT®, or as a general-purpose operating system with storage applications described herein or with configurable functionality, which is configured for storage applications as described herein.

In addition, it will be understood to those skilled in the art that the inventive technique described herein may apply to any type of special-purpose (e.g., server) or general-purpose computer, including a standalone computer or portion thereof, embodied as or including a storage system. A server may be defined as a computer adapted to provide one or more clients application services associated with a data set; in this context, a client can access the application services through a virtual filer implemented by the server. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Sharing Storage Resources Among a Plurality of Virtual Filers

The present invention relates to an architecture that provides the ability to create and maintain multiple instances of virtual servers, such as virtual filers (vfilers), within a single server, such as a filer. A vfiler is a logical partitioning of network and storage resources of the filer to establish an instance of a protocol-specific logical server. Each vfiler is maintained and executed without affecting other vfilers on the filer platform. To that end, dedicated filer resources, such as units of storage and network addresses of network interfaces may be arbitrarily grouped and "hard" partitioned to establish security domains within the filer platform. Yet common filer resources, such as storage devices and a storage operating system, may be shared among the vfilers. The vfiler architecture is disclosed in U.S. patent application Ser. No. 10/035,664 entitled, Architecture for Creating and Maintaining Virtual Filers on a Filer, which is hereby incorporated by reference as though fully set forth herein.

The present invention extends the vfiler abstraction to allow sharing of storage resources among vfilers in different security domains. By establishing a mapping of security objects between the domains, two or more vfilers participating in the different security domains may share common storage units. Mappings of security objects may be simplified when the domains correspond to the same type of network, such as a Windows-based or Unix-based network. For example, a unit of storage, i.e. an inode, having a user identifier UID and/or a group identifier GID relative to a Unix-based MS security domain may be correctly interpreted in a NIS+domain.

Figure 4:
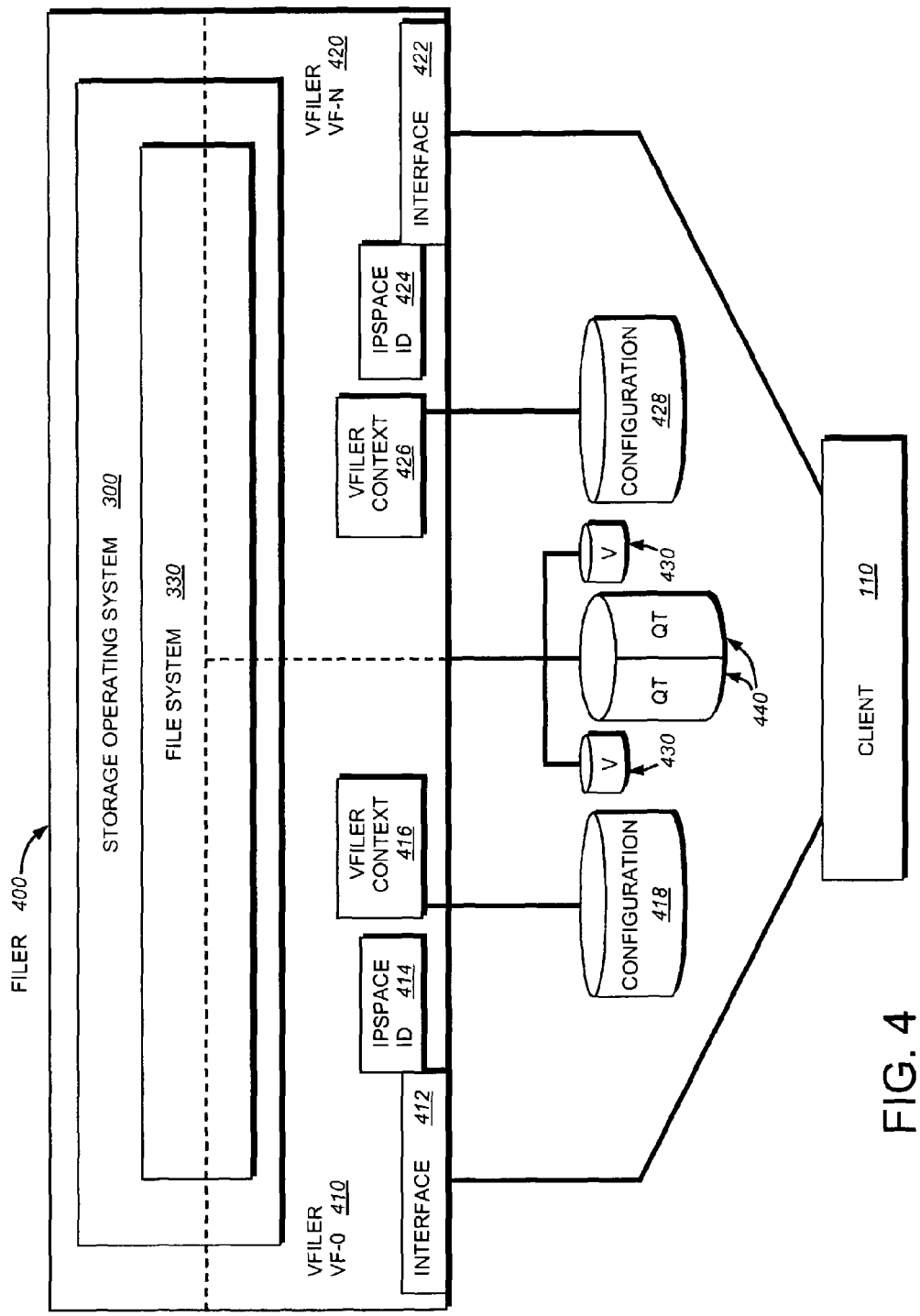
FIG. 4 is a schematic block diagram of an embodiment of a filer that may be advantageously used with the present invention.

FIG. 4 is a schematic block diagram of a filer platform 400 that may be advantageously used in accordance with the present invention. The filer comprises a storage operating system 300, typically resident in "in-core" memory 204, that implements a file system 330. The filer is logically partitioned into vfilers 410 and 420. Although only two vfilers are shown, those skilled in the art will understand the filer may implement any arbitrary number of vfilers. Each vfiler may be embodied as a server, such as a CIFS server, which is referenced by a logical name, e.g., VF-O and VF-N. Further, the vfilers may be configured to process file access requests in different security domains.

More specifically, vfiler 410 (VF-O) may be configured to process file access requests in an "old" security domain, whereas vfiler 420 (VF-N) may be configured in a "new" domain. When security objects have been mapped between the old and new security domains, the vfilers 410 and 420 may share a common set of storage resources, including volumes (V) 430 and qtrees (QT) 440. A client 110 may access data stored in the shared volumes and qtrees by issuing one or more file access requests, e.g., CIFS or NFS requests, in the old security domain to VF-O. Alternatively, the client may access the same data by issuing one or more requests to VF-N in the new security domain. In each case, client requests are directed to an appropriate network interface 412 or 422. In this context, the term network interface refers to an IP addressable interface, including a "physical" NIC and a "soft" NIC, such as a VIF, a VLAN and an emulated LAN (ELAN).

Each interface of the filer is assigned one or more IP addresses and an IPspace identifier (ID) 414 and 424 that essentially "binds" the interface to an IPspace. An IP-space refers to a distinct IP address space in which the filer and its storage operating system participate. A single filer can support multiple IPspaces. Each vfiler is associated with an IP address space and, thus, belongs to one IPspace. The IP addresses within each IPspace must be unique. However, vfilers may participate in different private networks that use overlapping IP address ranges. The IPspace is further described in copending and commonly-assigned U.S. patent application Ser. No. 10/035,666 entitled, Technique for Enabling Multiple Virtual Filers on a Single Filer to Participate in Multiple Address Spaces with Overlapping Network Addresses, which is hereby incorporated by reference as though fully set forth herein.

A vfiler context data structure 416 and 426, typically located in the in-core memory, is associated with each vfiler to define its networking environment, i.e., its naming and authentication scheme. Each of the vfiler contexts is associated with a private storage unit 418 and 428, i.e., a volume or qtree, that is adapted to store configuration information associated with the vfiler, e.g., the vfiler's name, associated domain servers and transport protocols utilized by the vfiler's file-system protocol, etc.

Figure 5:
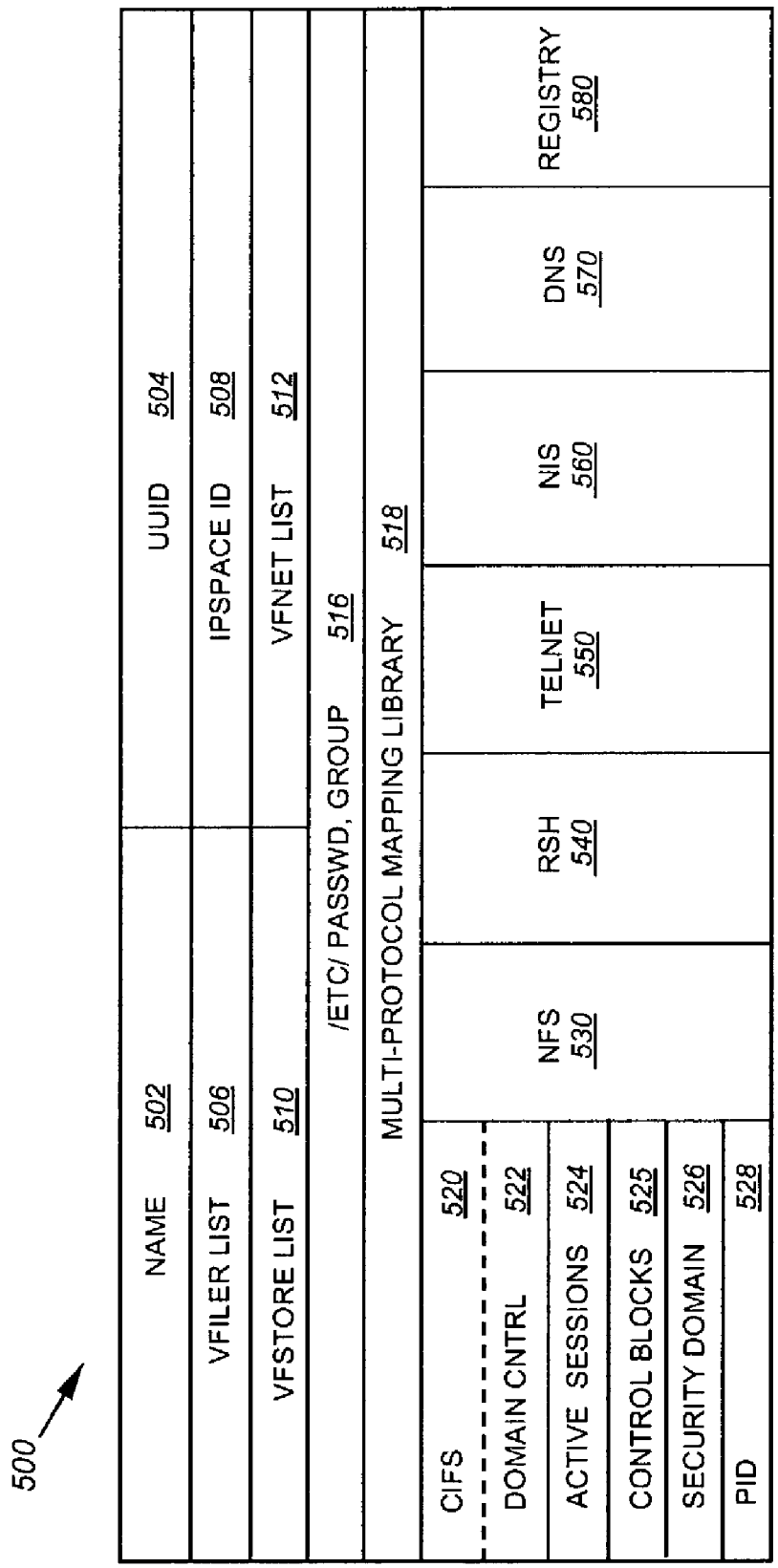
FIG. 5 is a schematic block diagram of a vfiler context data structure in accordance with the present invention.

More specifically, FIG. 5 illustrates an exemplary in core representation of a vfiler context 500 containing configuration information or "state" needed to establish an instance of a multi-protocol server. Multiple instances of these contexts, each corresponding to a different vfiler, provide the basis for the vfiler architecture. The vfiler context 500 includes fields for holding a name 502 of the vfiler and a universally unique identifier (UUID 504) that is created with the vfiler context. The UUID may comprise, e.g., the current time of day and a medium access control (MAC) address associated with the vfiler. A vfiler list field 506 contains a list of vfilers on the filer platform and an IPspace indicator (ID) field 508 holds the IPspace ID of the vfiler.

According to the vfiler architecture, hardware resources, such as storage and network devices, are not directly assigned to the vfilers. Instead, software objects representing (in full generality) only a portion of the capabilities of these hardware devices are assigned to the vfilers. These software ("soft") objects correspond only to a "dynamically adjustable" portion of a hardware resource. The advantage of using soft objects for assignment to a vfiler is total flexibility in allocating, adding, moving and removing complete or portions of hardware resources between vfilers on a physical filer.

Figure 6:
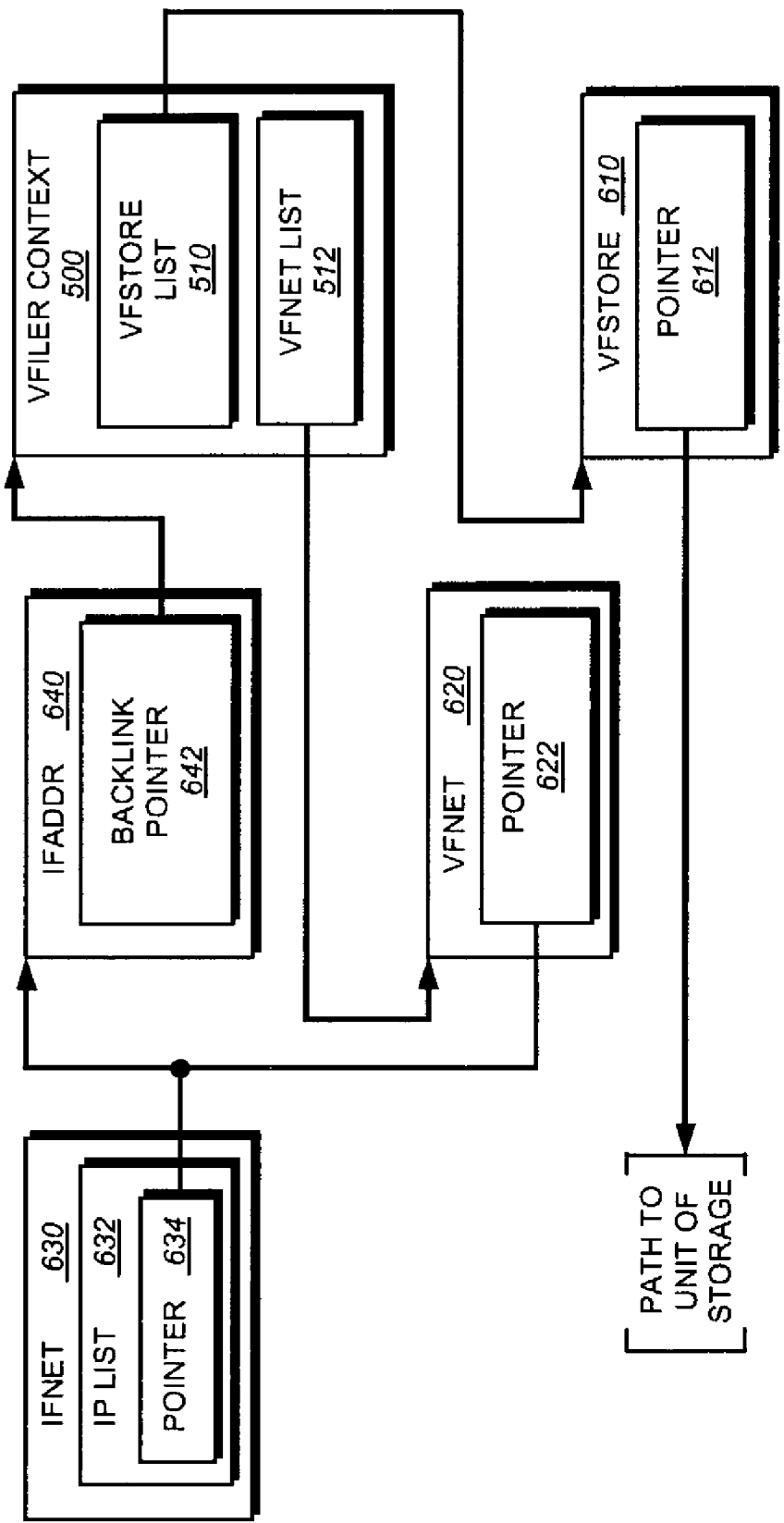
FIG. 6 is a schematic block diagram of soft object data structures that may be advantageously used with the present invention.

Therefore, other fields of the vfiler context structure 500 hold a list 510 of virtual filer storage (vfstore) structures (soft objects) and a list 512 of virtual filer network (vfnet) soft objects. FIG. 6 is a schematic block diagram illustrating soft object data structures that may be advantageously used with the present invention. In particular, the vfstore list 510 comprises pointers to vfstore soft objects 610, each of which has a pointer 612 that references a path to a unit of storage resource, such as a qtree or volume, allocated to the vfiler. As described further herein, this allows, e.g., a qtree or volume to be effectively shared between vfilers. A hash table (not shown) is also provided that "maps" each qtree or volume back to a vfiler context 500 (and thus a vfstore 610).

The vfnet list 512 comprises pointers to vfnet soft objects 620, each of which has a pointer 622 that references an interface address (ifaddr) data structure 640 representing an IP address assigned to the vfiler. Each vfnet object 620 represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects 620 and, thus, potentially different vfilers. If only a single IP address is associated with an interface (as represented by an interface network (ifnet) data structure 630), only one vfnet object 620, and therefore only one vfiler, uses the capabilities of the NIC.

Resource mapping is defined as the mapping between soft objects that represent assigned resources of a vfiler (e.g., vfstore and vfnet objects) to portions of hardware resources, such as a qtree/volume and an ifnet structure. The vfstore and vfnet soft objects thus provide a level of indirection that represents the dynamically adjustable portions of capabilities of these hardware resources. That is, these soft objects are "linked" to other software objects (data structures) representative of the hardware resources in a manner that enables flexibility when "logically" reassigning or sharing those network and storage resources by, e.g., changing pointers of the objects. Such flexibility allows logical establishment of vfiler configuration changes at the file system level, as opposed to physical establishment by, e.g., manually rearranging the network and storage hardware resources.

For example, an ifnet structure 630 includes an IP list field 632 that contains a list of IP addresses assigned to a network interface. The list 632, in turn, includes pointers 634 that reference appropriate ifaddr data structures 640 associated with those IP addresses. As noted, each vfnet object 620 may contain a pointer 622 to an ifaddr structure 640 (if the corresponding IP address is configured on an ifnet structure 630) or may contain a null value (if the address is not configured). Each ifaddr structure 640 also contains a back link pointer 642 to the vfiler context 500 (and therefore to a corresponding vfnet object 620).

Figure 7:
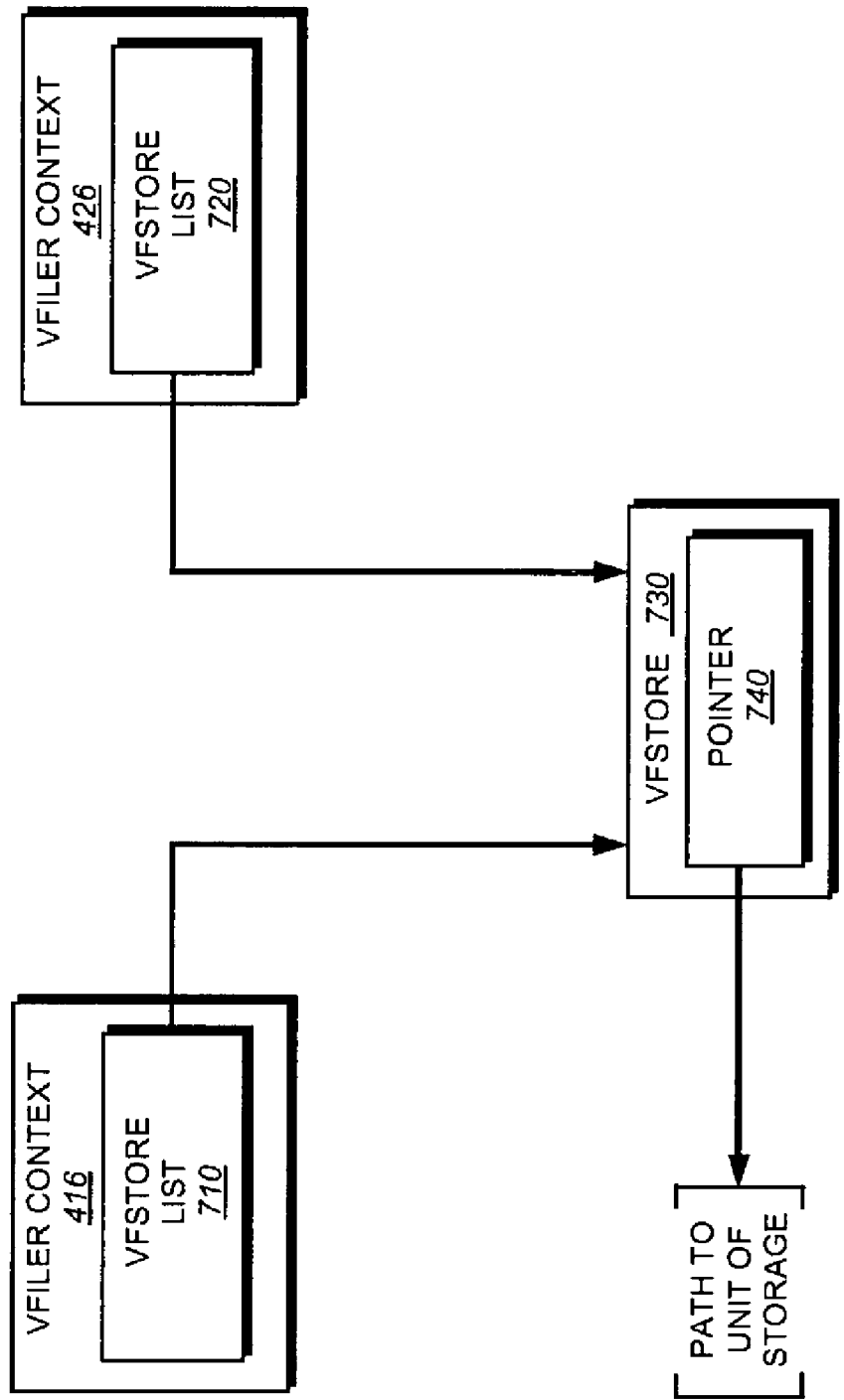
FIG. 7 is a schematic block diagram of a plurality of vfiler context data structures sharing access to a common storage resource using a soft object data structure.

Similarly, each vfstore object 610 has a pointer 612 to a path of a unit of storage, if the storage resource is online. According to the invention, one or more vfilers may comprise vfiler context data structures that reference a common vfstore soft object. In this manner, one or more vfilers may access a shared storage resource, such as a volume or qtree. For example, FIG. 7 illustrates vfiler context data structures 416 and 426 (corresponding to VF-O and VF-N, respectively) having associated vfstore lists 710 and 720. Both vfstore lists contain pointers to the vfstore soft object 730, which itself contains a pointer 740 referencing the path to a unit of storage. Thus, the unit of storage associated with the pointer 740 is accessible to vfilers VF-O and VF-N.

A feature of the novel vfiler architecture is that each vfiler is associated with a unique and distinct security domain from the perspective of a client. In addition, each vfiler shares access to a common file system 330 (e.g., the WAFL file system). Accordingly, interpretations of the security object associated with, e.g., a client accessing the common file system may vary among vfilers because each vfiler is associated with its own security domain. To address this, each vfiler context further includes information pertaining to the security domain of the vfiler to thereby enable controlled access to allocated and shared resources of the vfiler. Referring again to FIG. 5, each vfiler context 500 has a pointer to an /etc/passwd, group file 516 containing a user ID and group ID associated with each user password. Additionally, each vfiler context includes its own set of local Windows users and groups, together with network connections and other mechanisms necessary for authentication in a Windows environment, as described herein.

Because of the multi-protocol nature of the storage operating system, a situation may arise where a user (Windows client) in an NT4 security domain may attempt to access a file having NT5 style security (or vice versa). The vfiler architecture further includes a multi-protocol feature that supports multiple different clients having different types of security, and the ability to map those different client security types to different vfilers of a filer. In particular, the file system 330 implements a multi-protocol mapping procedure to determine whether a client can access a requested resource/file. This mapping procedure generally involves the use of a security controller associated with the security style of the resource to perform lookup operations into a security database to resolve the identity of the client/user. The novel vfiler context structure 500 implements this feature by providing a pointer that references a multi-protocol mapping library file 518 that enables translation of permission checking attributes from one protocol to another (e.g., NFS to NT security) or between different security domains (e.g., NT4 to NT5).

In operation, a vfiler may rely on the mapping library file to determine whether a client has permission to access a requested file. The vfiler may make a file access determination by comparing the requested file's associated security objects with the requesting client's security credentials. Here, a client's security credentials include the set of all security objects, such as user and group identifiers, associated with the client. When the client's credentials and the requested file's security objects are assigned in different security domains, the vfiler may translate the security credentials into the same domain as the security objects (or vice-versa) using the mapping file 518, thereby enabling the vfiler to make a valid comparison regarding the client's file access permissions.

Each vfiler context 500 further includes a plurality of "per-module" data structures that includes all information (such as global variables) needed for an instance of a particular protocol or subsystem. For example, a CIFS module data structure 520 contains all information needed for an instance of the CIFS protocol, including information about contacting a domain controller 522, active sessions 524 for the protocol and various control blocks 525 associated with the CIFS protocol. The domain controller is a network server that accepts logon requests and initiates their authentication. Information pertaining to a security domain 526 is also provided to enable NT-type security for a CIFS request. The security information includes a security identifier having a domain portion and a relative ID (RID) portion, the latter RID being similar to the user ID of UNIX security. In the case of Windows domain security, the security information also includes a trust relationship with the domain controller. The trust relationship signifies the ability of a vfiler to "trust" the domain controller to authenticate a user on behalf of the vfiler. Each CIFS module 520 also contains a process ID (PID 528) of the CIFS authentication process that enables the CIFS layer to send an authentication request to the correct CIFS authentication process.

There is a similar "per-module" data structure for each of the protocols and sub-systems associated with a vfiler including, but not limited to, the NFS protocol 530, Remote SHell (RSH) protocol 540, Telnet protocol 550, MS subsystem 560, domain name service (DNS) subsystem 570 and registry 580. The MS subsystem or "yellow pages" is a service locator for the NFS protocol that is implemented as a distributed database storing security information, such user and group IDs associated with each user password. The NIS subsystem module 560 includes information for contacting a NIS controller when access to the distributed security database is required (using, e.g., the /etc/passwd,group information stored in file 516). The DNS subsystem facilitates resolution of a DNS name to a corresponding IP address. The registry is a repository for configuration information pertaining to the hardware, software and users of the filer (and each vfiler).

D. Transitioning a Filer to a New Security Domain

According to the invention, a filer's data set may be gracefully transitioned from an old security domain to a new, e.g. upgraded, domain by instantiating vfilers configured to participate in each domain. Specifically, during a "transition period" clients may access the server's data set in either the old or new security domain through the appropriate vfiler. The vfilers are referenced by different logical names and IP addresses, yet share a common set of storage resources, such as volumes or qtrees, within the filer. Thus, client access requests of a specific protocol type, such as CIFS, for the common data set may be gradually redirected from the vfiler in the old domain to the vfiler in the new domain. Advantageously, clients may be slowly transitioned to the vfiler in the new security domain, thereby allowing IT personnel to test the new domain while simultaneously providing file service in the old domain.

Referring again to FIG. 4, a client 110 forms an access request for data stored on the filer. The requested data may be located, e.g., in a storage volume 430 or qtree 440. The request (such as a NFS, CIFS, HTTP or Telnet packet) includes a destination IP address associated with either network interface 412 or 422, depending on whether the request is sent in the old security domain (to vfiler VF-O) or in the new security domain (to vfiler VF-N). Upon receiving the request, the storage operating system of the filer selects an appropriate vfiler context 416 or 426 based, in part, on the IPspace ID (414 or 424) of the interface that received the request. If necessary, the selected vfiler context "maps" security objects (i.e., the "credentials") of the requested data between the security domains, e.g., using library 518. That is, the client may send a request to the vfiler in the new domain (VF-N) for a file or directory associated with a UID and/or GID in the old domain, or vice versa. Thereafter, the request is processed by the storage operating system 300 in accordance with the context and security domain of the vfiler that owns the storage.

Figure 8:
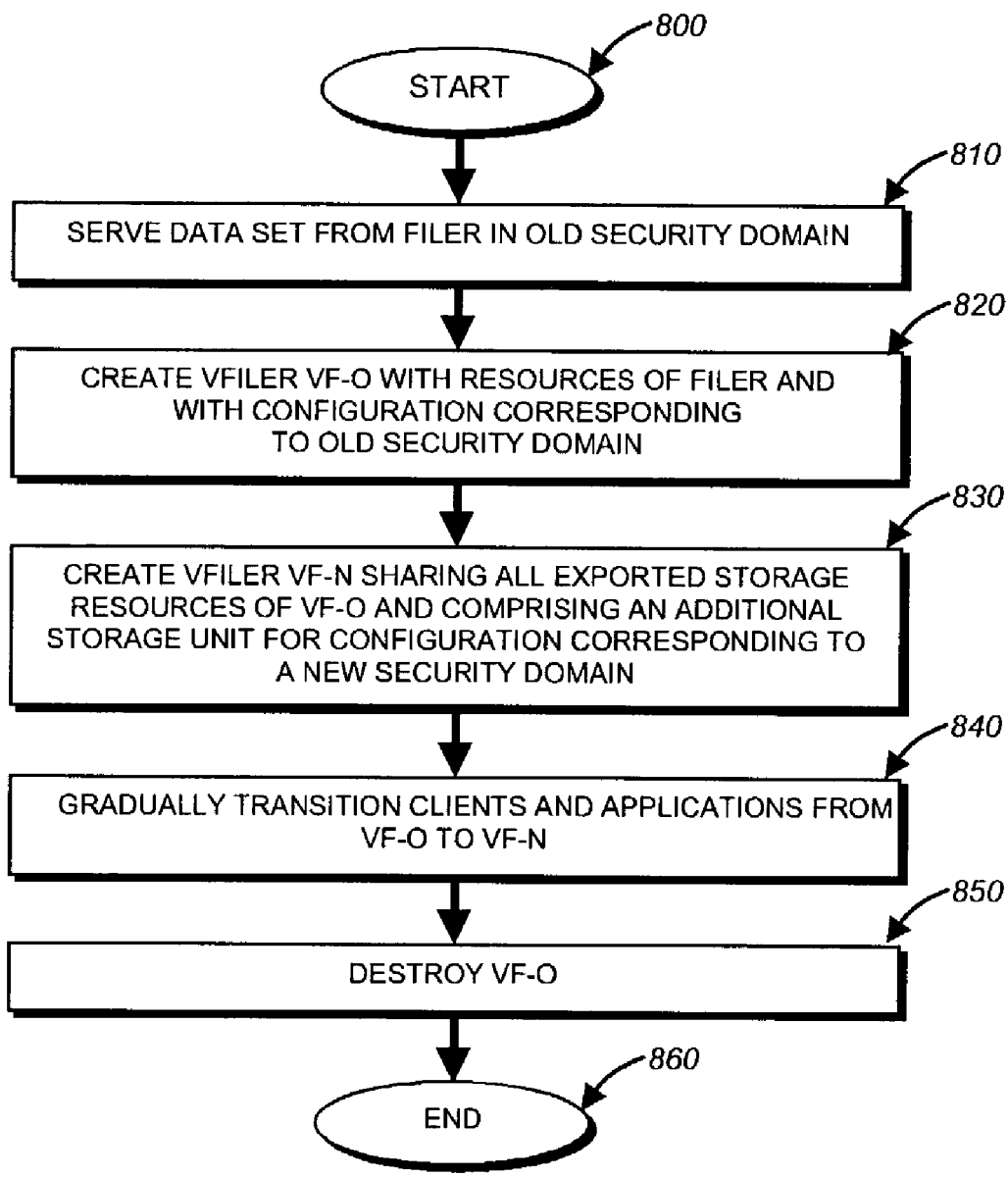
FIG. 8 is a flowchart illustrating a sequence of steps embodying the invention for gradually transitioning a filer from an old security domain to a new security domain.

FIG. 8 is a flowchart illustrating a sequence of steps for gradually transitioning a filer from an old security domain to a new security domain. The sequence starts at step 800, and proceeds to step 810 where a data set is initially served from the filer in an old security domain, e.g., NT4. At step 820, a vfiler VF-O is instantiated having the network and storage resources of the filer and a configuration corresponding to the old security domain. Next, at step 830, a new vfiler VF-N is instantiated on the filer. The new vfiler shares some or all exported storage resources of the vfiler VF-O and comprises an additional private storage unit that stores configuration information for a new security domain, e.g., NT5. As used herein, "exported" storage resources include storage units, i.e., volumes and qtrees, that may be shared among vfilers. In this case, the exported storage resources comprise the filer's data set, so a client in the old or new security domain can access the data set via requests to either VF-O or VF-N.

At step 840, IT personnel gradually transition clients and applications from VF-O to VF-N, with continuous testing of the new security domain as appropriate. Clients continue to access the filer's data set in the old security domain while the new domain is tested and debugged. Thus, clients do not experience any downtime in service during this transition. When the transition to the new domain is complete, at step 850, all client access is directed to vfiler VF-N, and vfiler VF-O is destroyed. Those skilled in the art will appreciate there may be situations when it is desirable not to destroy VF-O, but instead keep both of the vfilers operational. For instance, there may be network environments where not all clients will transition to the new security domain, so it is necessary to maintain the vfiler in the old security domain. In these situations, step 850 is by-passed. The sequence ends at step 860 where vfiler VF-N serves the filer's data set in the new security domain.

E. Transitioning a Filer to a New IP Address Scheme

In an illustrative embodiment of the invention, a filer may comprise two or more vfilers, each participating in a different IP address scheme, yet configured to share a set of storage resources, such as volume or qtrees. Therefore, the filer may be transitioned, e.g., by a system administrator, from an old IP address scheme to a new IP address scheme by gradually phasing out file access requests sent to a vfiler participating in the old IP address scheme and redirecting those requests to a vfiler in the new IP address scheme. Since both vfilers share the filer's storage resources, clients do not experience any downtime in service during the transition. While the illustrative embodiment relates to Internet Protocol addressing schemes, those skilled in the art will understand the teachings set forth herein equally apply to transitioning a filer between other types of address schemes as well.

Figure 9:
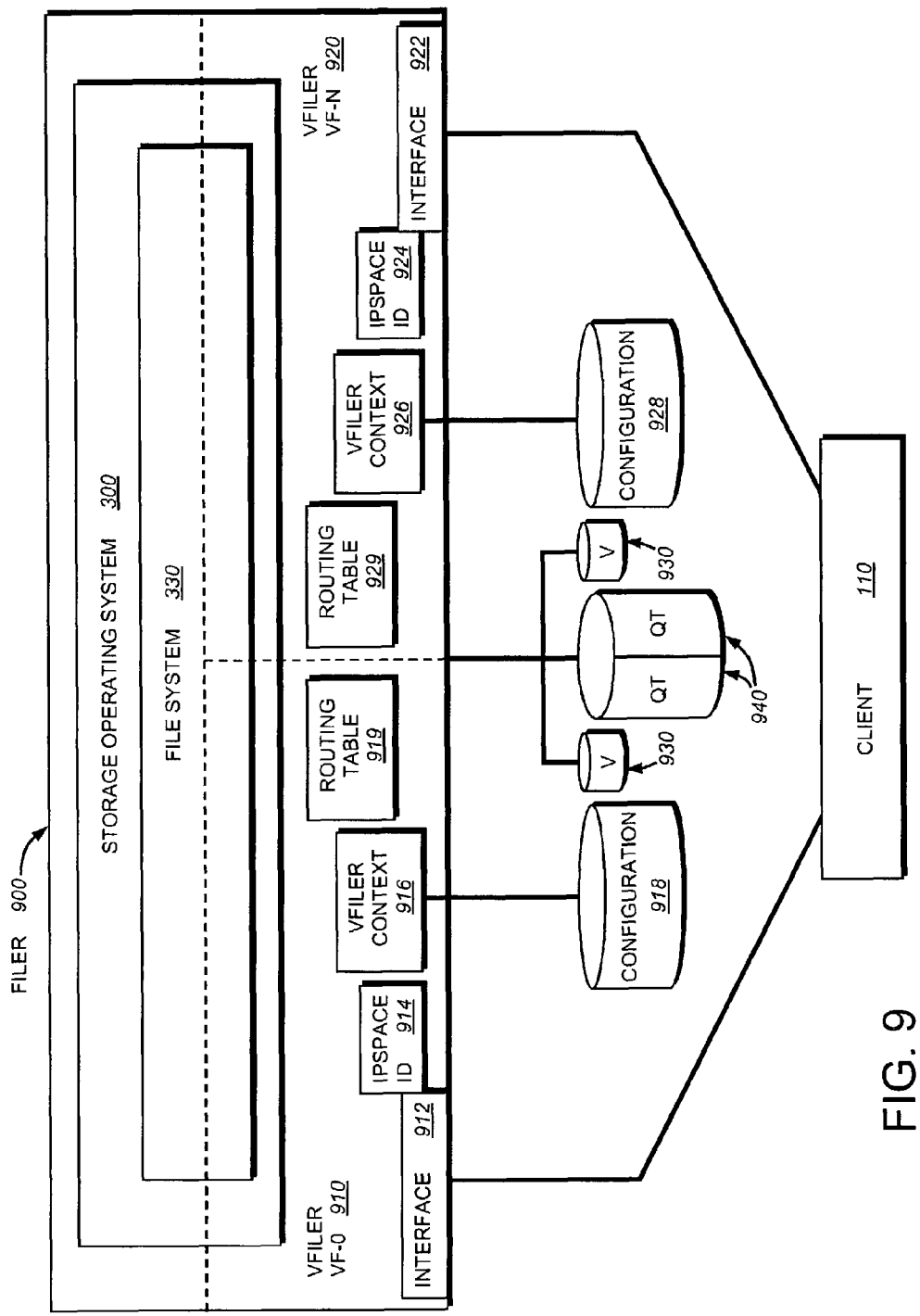
FIG. 9 is a schematic block diagram of a second embodiment of a filer that may be advantageously used with the present invention.

FIG. 9 is a schematic block diagram of a filer platform 900 in accordance with the present invention. The filer comprises storage operating system 300 that implements file system 330 and that resides in "in-core" memory 204. The filer is logically partitioned into vfilers 910 and 920. Although only two vfilers are shown, those skilled in the art will understand the filer may implement any arbitrary number of vfilers. Each vfiler is embodied as a protocol-specific logical server, such as a CIFS server, which is referenced by a logical name, e.g., VF-O and VF-N. The vfilers may be configured to process file access requests in distinct security domains. A vfiler context data structure 916 and 926 is associated with each vfiler to define its networking environment, i.e., its naming and authentication scheme. Each vfiler context is associated with a private storage unit 918 and 928, i.e., a volume or qtree, that is adapted to store configuration information associated with the vfiler.

In general, vfiler 910 (VF-O) may be configured to process file access requests addressed in an "old" IP address scheme, whereas vfiler 920 (VF-N) may be configured to process requests in a "new" IP address scheme. For instance, VF-O may implement an IP addressing scheme in accordance with IP version 4 (IPv4), whereas VF-N may implement an addressing scheme in accordance with a newer IP protocol, such as IP version 6 (IPv6). As previously described, the vfilers 910 and 920 may share a common set of storage resources, including volumes (V) 930 and qtrees (QT) 940. To access data in the storage resources, client requests are directed to an appropriate network interface 912 or 922. For example, a client 110 may access data stored in the shared volumes and qtrees by issuing one or more file access requests, e.g., CIFS or NFS requests, to an IP address in the old IP address scheme (to interface 912). Alternatively, the client may access the same data by issuing one or more requests to an IP address in the new IP address scheme (to interface 922).

As noted, each network interface is assigned one or more IP addresses and an IP-space identifier (ID) 914 and 924 that essentially "binds" the interface to an IPspace. An IPspace is further associated with a routing domain and the use of one or more routing tables. Therefore, vfiler 910 maintains a routing table 919 for controlling routing operations for all requests processed by VF-O, and vfiler 920 similarly maintains a routing table 929 which may or may not differ from table 919. Any routing table can only refer to (and thus cause packets to be routed to) interfaces that belong to the IPspace of the routing table. The implementation of IPspaces and routing domains is further described more fully in the above-referenced patent application Technique for Enabling Multiple Virtual Filers on a Single Filer to Participate in Multiple Address Spaces with Overlapping Network Addresses.

Operationally, a client 110 forms an access request for data stored on the filer. The requested data may be located, e.g., in a storage volume 930 or qtree 940. The request (such as a NFS, CIFS, HTTP or Telnet packet) includes a destination IP address associated with either network interface 912 or 922, depending on whether the request is sent to an IP address in the old IP address scheme (to vfiler VF-O) or in the new IP address scheme (to vfiler VF-N). Upon receiving the request, the storage operating system of the filer selects an appropriate vfiler context 916 or 926 based, in part, on the IPspace ID (914 or 924) of the interface that received the request. If necessary, the selected vfiler context "maps" security objects (i.e., the "credentials") of the requested data between different security domains. Thereafter, the request is processed by the storage operating system 300 in accordance with the context and security domain of the vfiler that received the request.

Figure 10:
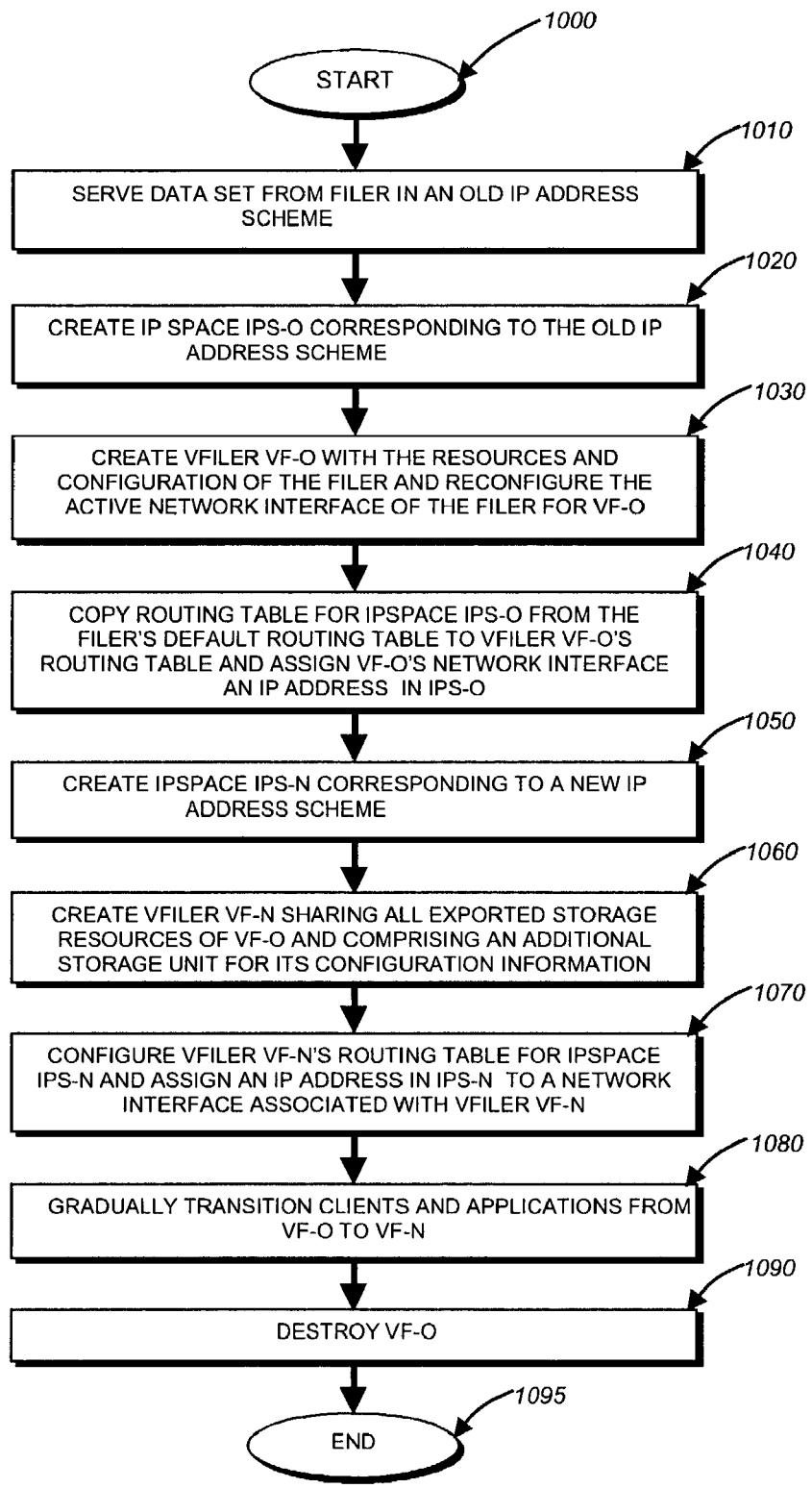
FIG. 10 is a flowchart illustrating a sequence of steps embodying the invention for gradually transitioning a filer from an old IP address scheme to a new IP address scheme.

FIG. 10 is a flowchart illustrating a sequence of steps for gradually transitioning a filer from an old IP address scheme to a new IP address scheme. While the illustrated method refers to Internet Protocol addressing schemes, those skilled in the art will understand the sequence of steps may be applied to transitioning a filer between any types of address schemes. The sequence starts at step 1000, and proceeds to step 1010 where a data set is initially served from a filer participating in an "old" IP address. At step 1020, an IPspace IPS-O is created corresponding to the old IP address scheme. Next, at step 1030, a vfiler VF-O is instantiated on the filer. The vfiler VF-O has the resources and configuration of the filer, and the active network interface and IP address of the filer are reconfigured for vfiler VF-O. The filer's routing information for IPspace IPS-O is copied from a routing table of the filer into the routing table for VF-O, at step 1040. Additionally, an IP address in IPS-O is then assigned to vfiler VF-O's network interface.

At step 1050, an IPspace IPS-N is created corresponding to a "new" IP address scheme. A vfiler VF-N is instantiated on the filer, at step 1060, sharing some or all exported storage resources of the vfiler VF-O, and comprising an additional storage unit for its configuration information. At step 1070, the vfiler VF-N's routing table is configured for the IPspace IPS-N and an appropriate network interface of the filer is associated with VF-N and assigned an IP address in IPS-N. Thus, clients may concurrently access the filer's data set via requests to a vfiler interface in the old address scheme (to VF-O) or in the new address scheme (to VF-N).

At step 1080, IT personnel gradually transition clients and applications from VF-O to VF-N, with continuous testing of the new IP address scheme as appropriate. Clients continue to access the filer's data set in the old IP address scheme while the new IP address scheme is tested and debugged. Thus, clients do not experience any downtime in service from the filer during this transition. When the transition to the new domain is complete, at step 1090, all client access is directed to vfiler VF-N, and vfiler VF-O is destroyed. Those skilled in the art will appreciate there may be situations when it is desirable not to destroy VF-O, but instead keep both of the vfilers operational. For example, there may be network environments where not all clients will transition to the new IP address scheme, so it is necessary to maintain the vfiler in the old IP address scheme. In these situations, step 1090 is bypassed. The sequence ends at step 1095 where vfiler VF-N serves the filer's data set in the new IP address scheme.

F. Conclusion

The foregoing has been a detailed description of an illustrative embodiment of the invention. Various modifications and additions can be made without departing from the spirit and scope of the invention. While this description has been written in reference to filers and file servers, the principles are equally pertinent to all types of computers, including stand alone computers. Further, it is expressly contemplated that the teachings of this invention can be implemented as software, including a computer-readable medium having program instructions executing on a computer, hardware, firmware, or a combination thereof. The software may be embodied as electro-magnetic signals propagating over a network. Accordingly this description is meant to be taken only by way of example and not to otherwise limit the scope of the invention.

What is claimed is:

1. A method for operating a computer system, comprising:
executing a filer on the computer, the filer instantiating a first virtual server and a second virtual server;
operating the first virtual server in a first security domain to provide access for a client to resources, the client gaining access to the resources by presentation of a first security credentials for comparison with a first security objects of the resources, the first security credentials and the first security objects operable within the first security domain;
transitioning the filer from the first security domain to a second security domain by transitioning the client from the first virtual server in the first security domain to the second virtual server in the second security domain;
transitioning the resources from the first security domain to a second security domain, the transitioning including upgrading the first security objects to a second security objects operable with the second security domain, the resources accessible by the second virtual server in the second security domain with the second security credentials for comparison with the second security objects;
mapping the first security credentials of the client to the second security objects to allow the client to access the resources using the first security credentials to provide a transition of the resources from the first security domain to the second security domain while allowing access to the resources by the client using the first security credentials to permit the client to access the resources using both the first security credentials and the second security credentials after the resources have been transitioned to the second security domain.

2. The method as in claim 1, further comprising:
permitting the client to access the resources by using the first security credentials with the first virtual server in the first security domain while also permitting the client to access the resources using the second security credentials with the second virtual server in the second security domain to permit access by the client to the resources while transitioning the filer from the first security domain to the second security domain.

3. The method as in claim 1, further comprising:
processing a first request by the client for the resources by directing the first request to a first network interface operable in the first security domain and processing a second request by the client for the resources by directing the second request to a second network interface operable in the second security domain.

4. The method as in claim 1, further comprising:
testing the second virtual server while gradually transitioning client requests from the first virtual server to the second virtual server.

5. The method as in claim 1, further comprising:
destroying the first virtual server if testing the second virtual server indicates that the second virtual server operates correctly.

6. The method as in claim 1, further comprising:
configuring an operating system to permit information technology personnel to gradually transition the client from the first virtual server to the second virtual server.

7. The method as in claim 1, further comprising:
configuring an operating system for the first virtual server to map the first security objects operable within the first security domain to the second security domain.

8. The method as in claim 1, further comprising:
processing a first request by the client for the resources by directing the first request to a first network interface operable in a first network address scheme and processing a second request by the client for the resources by directing the second request to a second network interface operable in a second network address scheme.

9. The method as in claim 1, further comprising:
assigning a first network address to the first virtual server and assigning a second network address to the second virtual server, and transitioning client requests from the first network address to the second network address.

10. The method as in claim 9, further comprising:
using an IP address as the network address.

11. A computer system, comprising:
a filer executing on the computer, the filer instantiating a first virtual server and a second virtual server;
the first virtual server to operate in a first security domain to provide access for a client to resources, the client gaining access to the resources by presentation of a first security credentials for comparison with a first security objects of the resources, the first security credentials and the first security objects operable within the first security domain;
the filer to transition from the first security domain to a second security domain by transitioning the client from the first virtual server in the first security domain to the second virtual server in the second security domain;
an operating system configured to transition the resources from the first security domain to the second security domain, the transitioning including upgrading the first security objects to the second security objects operable with the second security domain, the resources accessible by the second virtual server in the second security domain with the second security credentials for comparison with the second security objects; and
the operating system further configured to map the first security credentials of the client to the second security objects to allow the client to access the resources using the first security credentials to provide a transition of the resources from the first security domain to the second security domain while allowing access to the resources by the client using the first security credentials to permit the client to access the resources using both the first security credentials and the second security credentials after the resources have been transitioned to the second security domain.

12. The computer system as in claim 11, further comprising:
the operating system to permit the client to access the resources by using the first security credentials with the first virtual server in the first security domain while also permitting the client to access the resources using the second security credentials with the second virtual server in the second security domain to permit access by the client to the resources while transitioning the filer from the first security domain to the second security domain.

13. The computer system as in claim 11, further comprising:
the operating system to process a first request by the client for the resources by directing a request to a first network interface operable in the first security domain and processing a second request by the client for the resources by a directing the request to a second network interface operable in the second security domain.

14. The computer system as in claim 11, further comprising:
the operating system to test the second virtual server while gradually transitioning the client requests from the first virtual server to the second virtual server.

15. The computer system as in claim 11, further comprising:
the operating system to destroy the first virtual server if testing the second virtual server indicates that the second virtual server operates correctly.

16. The computer system as in claim 11, further comprising:
the operating system to permit information technology personnel to gradually transition the client from the first virtual server to the second virtual server.

17. The computer system as in claim 11, further comprising:
the operating system for the first virtual server to map the first security objects operable in the first security domain to the second security domain.

18. The computer system as in claim 11, further comprising:
a first network interface operable with a first network address to process a first request by the client for the resources and a second network interface operable with a second network address to process a second request by the client for the resources.

19. The computer system as in claim 18, further comprising:
a first IP address used as the first network address and a second IP address used as the second network address.

20. A computer readable non-transitory storage media, comprising:

said computer readable storage media containing program instructions for execution on a processor for a method of operating a computer system the program instructions for, executing a filer on the computer, the filer instantiating a first virtual server and a second virtual server;

operating the first virtual server in a first security domain to provide access for a client to resources, the client gaining access to the resources by presentation of a first security credentials for comparison with a first security objects of the resources, the first security credentials and the first security objects operable within the first security domain;

transitioning the filer from the first security domain to a second security domain by transitioning the client from the first virtual server in the first security domain to the second virtual server in the second security domain;

transitioning the resources from the first security domain to a second security domain, the transitioning including upgrading the first security objects to a second security objects operable with the second security domain, the resources accessible by the second virtual server in the second security domain with the second security credentials for comparison with the second security objects; and mapping the first security credentials of the client to the second security objects to allow the client to access the resources using the first security credentials to provide a transition of the resources from the first security domain to the second security domain while allowing access to the resources by the client using the first security credentials to permit the client to access the resources using both the first security credentials and the second security credentials after the resources have been transitioned to the second security domain.

* * * * *

UNITED STATES PATENT AND TRADEMARK OFFICE
CERTIFICATE OF CORRECTION

PATENT NO.        : 8,041,761 B1                                   Page 1 of 1
APPLICATION NO.   : 10/327755
DATED             : October 18, 2011
INVENTOR(S)       : Gaurav Banga It is certified that error appears in the above-identified patent and that said Letters Patent is hereby corrected as shown below:

In Col. 2, line 29 should read as follows:
  able to configure a server to participate in a ~~MS~~ NIS domain for In Col. 9, line 51 should read as follows:
  based ~~MS~~ NIS security domain may be correctly interpreted in a In Col. 13, line 2 should read as follows:
  (RSH) protocol 540. Telnet protocol 550, ~~MS~~ NIS subsystem 560, In Col. 13, line 4 should read as follows:
  The ~~MS~~ NIS subsystem or "yellow pages is a service locator for In Col. 17, line 65 should read as follows:
  security objects to ~~the~~ a second security objects operable In Col. 18, line 66 should read as follows:
  20. A non-transitory computer readable ~~non-transitory~~ storage media Signed and Sealed this
First Day of May, 2012

David J. Kappos
*Director of the United States Patent and Trademark Office*